(12) United States Patent
Habibnia Rami et al.

(10) Patent No.: US 11,772,790 B2
(45) Date of Patent: Oct. 3, 2023

(54) FLIGHT PROPULSION SYSTEM BASED ON ROTARY AND STATIONARY DEVICES

(71) Applicant: UNIVERSIDADE DA BEIRA INTERIOR, Covilha (PT)

(72) Inventors: Mehdi Habibnia Rami, Covilha (PT); Frederico Miguel Freire Rodrigues, Sarzedo (PT); Jose Carlos Pascoa Marques, Covilha (PT)

(73) Assignee: UNIVERSIDADE DA BEIRA INTERIOR, Covilha (PT)

( * ) Notice: Subject to any disclaimer, the term of this patent is extended or adjusted under 35 U.S.C. 154(b) by 168 days.

(21) Appl. No.: 17/604,946

(22) PCT Filed: Jun. 24, 2020

(86) PCT No.: PCT/IB2020/055983
§ 371 (c)(1),
(2) Date: Oct. 19, 2021

(87) PCT Pub. No.: WO2020/261149
PCT Pub. Date: Dec. 30, 2020

(65) Prior Publication Data
US 2022/0234729 A1    Jul. 28, 2022

(30) Foreign Application Priority Data
Jun. 25, 2019  (PT) .......................... 115598

(51) Int. Cl.
*B64C 39/00*   (2023.01)
*B64C 23/00*   (2006.01)
(Continued)

(52) U.S. Cl.
CPC .......... *B64C 39/005* (2013.01); *B64C 23/005* (2013.01); *B64C 27/32* (2013.01);
(Continued)

(58) Field of Classification Search
CPC .. B64C 39/003; B64C 39/005; B64C 2230/12
See application file for complete search history.

(56) References Cited

U.S. PATENT DOCUMENTS 5,265,827 A   11/1993   Gerhardt

FOREIGN PATENT DOCUMENTS

DE   102017011890 A1   6/2019
EP       3281865 A1   2/2018

OTHER PUBLICATIONS

International Search Report and Written Opinion dated Nov. 11, 2020 for PCT/IB2020/055983 (15 pages).

*Primary Examiner* — Nicholas McFall
(74) *Attorney, Agent, or Firm* — LUCAS & MERCANTI, LLP

(57) ABSTRACT

A flight propulsion system for Vertical Take-Off and Landing (VTOL) and Short Take-Off and Landing (STOL) aircraft, having a two cyclorotors, installed in the front and rear portions of a pair-wings mechanism involving top wing and bottom wing, three degree-of-freedom DOF adjusting mechanism for pair-wings, a dielectric barrier discharge (DBD) plasma actuators, a bar mechanism for pitching oscillation and rotation speed controls and rear cyclorotor, a yawing mechanism for rear cyclorotor, all on each side of the flight vehicle. This propulsion system is particularly useful for VTOL aircraft. The main features are: high controllability and manoeuvrability, low noise and environmental pollutions, VTOL, STOL, hover state flights, marine and ground take-off and landing, high safety, suitable for different aircraft scales and for different missions and purposes, instant altering the flight direction.

11 Claims, 3 Drawing Sheets

(51) Int. Cl.
   *B64C 29/00* (2006.01)
   *B64C 39/08* (2006.01)
   *G05D 1/08* (2006.01)
   *B64C 27/32* (2006.01)
(52) U.S. Cl.
   CPC .......... *B64C 29/0025* (2013.01); *B64C 39/08* (2013.01); *G05D 1/0858* (2013.01); *B64C 2230/12* (2013.01)

FLIGHT PROPULSION SYSTEM BASED ON ROTARY AND STATIONARY DEVICES

CROSS-REFERENCE TO RELATED APPLICATIONS

This application is a 371 of PCT/IB2020/055983, filed Jun. 24, 2020, which claimed the priority of Portuguese Application No. 115598, filed Jun. 25, 2019, both of which are incorporated herein by reference.

TECHNICAL DOMAIN

The present invention is related to a flight propulsion system for Vertical Take-Off and landing (VTOL) and Short Take-Off and Landing (STOL) aircraft using two cyclorotors, the first one located at the front, and the second one located at the rear portions of the pair-wings in the middle of the rotors of the aircraft, and dielectric barrier discharge DBD plasma actuators on the bottom wing, all on both sides of the aircraft providing extremely high controllability and take-off and landing phases to occur on both marine and ground surfaces.

SUMMARY

The present invention describes a flight propulsion system applied to an aircraft, each side of the aircraft comprising a set of a top wing; a bottom wing, placed bellow the top wing within a range of an inlet patch and a range of an outlet patch; a front cyclorotor, with a predetermined radius, placed in front of both top wing and bottom wing, aligned with the inlet patch; a rear cyclorotor, with a predetermined radius, placed in front of the top wing and bottom wing, aligned with the outlet patch; a yawing control mechanism applied on the rear cyclorotor; wherein both top wing is arranged horizontally within an angle and the bottom wing is arranged horizontally within an angle, the bottom wing is placed in an advanced horizontal position with regard to the top wing lying partially bellow the front cyclorotor, the top wing is placed in a retracted horizontal position with regard to the bottom wing lying partially over the rear cyclorotor, and the yawing control mechanism of the rear cyclorotors promotes the creation of a yaw angle on the left-side and a yaw angle of the right-side with regard to the perpendicular trajectory of the aircraft.

In a proposed embodiment of the proposed flight propulsion system, the radius of the rear cyclorotor comprises a range of values between 20% to 80% of the radius of the front cyclorotor.

Yet in another embodiment, the system further comprises at least one dielectric barrier discharge plasma actuator installed over the rear edge of the bottom wing.

Yet in another embodiment, the system further comprises a three degree of freedom control mechanism operating independently both top wing and bottom wing.

Yet in another embodiment, the front cyclorotor and the rear cyclorotor further comprise a set of at least four blades.

Yet in another embodiment, the set of at least four blades further comprises dielectric barrier discharge plasma actuators.

Yet in another embodiment, the set of at least four blades is adjusted in a pitching oscillation angle.

Yet in another embodiment, the dielectric barrier discharge plasma actuator comprises two electrodes asymmetrically mounted on each side of a dielectric layer material which provides electrical insulation between both electrodes.

Yet in another embodiment, one of the electrodes is power supplied by an AC voltage signal with voltage amplitudes between 5 and 80 kVpp and frequencies between 1 and 60 kHz.

Yet in another embodiment, the three degree of freedom control mechanism controls independently the vertical displacement, horizontal displacement and rotation angle of both top wing and bottom wing with regard to front cyclorotor and rear cyclorotor.

Yet in another embodiment, the yaw angle of the left-side rear cyclorotor and the yaw angle of the right-side rear cyclorotor comprise values set between +35° degrees and −35° degrees with regard to the perpendicular trajectory of the plane.

PRIOR ART

The invention described herein is based on a flight propulsion system that performs vertical take-off and landing or even short take-off and landing with improved efficiency. The proposed propulsion system is composed of both rotary and stationary components to enhance the overall operating efficiency of the system, especially on lifting states.

Prior art documents, namely document U.S. Pat. No. 5,265,827A, discloses an aircraft with vertical take-off and landing capability having at least two laterally paddle wheels rotatable on a central axis. Each of the paddle wheels has a plurality of blades pivoted by a system to obtain a determined blade pitch angle. In one embodiment the aircraft comprises only a pair of paddle wheels which provide lift, thrust, roll and yaw control of the aircraft while the pitch of the aircraft is controlled through a vertical axis rotor. In another embodiment the aircraft comprises two paddle wheel pairs in which the separate pitch control rotor is unnecessary. Although, this invention may comprise two or more paddle wheels, it does not makes use of wings neither a pair-wing nozzle mechanism to optimize the lift and manoeuvrability. In the mentioned invention, the use of plasma actuators is not considered too.

GENERAL DESCRIPTION

The tendency to equip aircraft with cycloidal rotors (shortly say, cyclorotors) as means of Vertical Take-Off and Landing (VTOL) propulsors has increased in recent years. Considerably lower noise production and more stable hover and vertical displacements in comparison with those of conventional screw propellers, as used in helicopters, are the main reasons to witness this tendency.

Aircraft being capable of VTOL and hover are increasingly emerging in various critical and routine applications. Rescue missions in roads and environmental disasters, observance and monitoring-based carriers, surveillance cameras, payload carriage in situations like transmitting forest tree are, just to mention a few examples. Within VTOL category, numerous designs have been proposed along the years. Helicopters are the most typical crafts in this kind, but concerning the thrusting mechanism, several alternatives are yet in hand.

Herein, for the proposed flight propulsion system, the goal is to benefit from the terminology of the cyclorotors, or cycloidal rotors, but to use them in a systematic arrangement in order to enhance the flight characteristics.

With that said, this invention is related to a flight propulsion system for Vertical Take-Off and Landing (VTOL) and Short Take-Off and Landing (STOL) aircraft, mainly consisting in two cyclorotors, referenced as front and rear cyclorotors, and pair-wings positioned horizontally in between the cyclorotors. This propulsion system provides both STOL and VTOL flights for the aircraft, and since the principal working medium is the airflow, highly less environmental pollution will be produced. The design of this invention is such that considerably low noise is made, and an extremely high manoeuvrability and instant controllability is attained using this flight propulsion system.

In this invention, the horizontal pair-wings operate as a nozzle-like cascade to inhale a desired portion of the downwash airflow from the front cyclorotor, and convect properly the channelled airflow toward the rear cyclorotor. The developed system is applied on both sides of the aircraft. A dielectric barrier discharge DBD plasma actuator on the aft-portion of the suction surface of the bottom wing is also considered, preventing any flow separations, and minimizing the flow perturbations convecting to rear cyclorotor.

The front cyclorotor presents a wider diameter when compared to the rear cyclorotor. In addition, the rear cyclorotor operates at considerably higher rotational speeds when compared with the front cyclorotor. Using a control mechanism, the rear cyclorotor is yawing from its mid-span and thus provides instant flight direction shifting in all working conditions.

The two sets of cyclorotors are placed on each side of the aircraft, and are configured with different specifications, since they hold different tasks and missions. A double wing assembly is designed to place in between the two cyclorotors on each side of the aircraft. The bottom wing promotes the division of the air flow in two separate portions through the downwash region of the front cyclorotor. These two portions can be controlled using existing control systems to displace the wings in three different motions. The top wing thus, provides a channel-like passage in nozzle-shape to work on the passing airstream to enhance its properties for a better thrust and lift forces.

Once the cyclorotors allow to make the system more efficient in terms of controllability and manoeuvrability, using a yawing system for the rear cyclorotors on each side of the aircraft propulsion system, will give a highly instantaneous direction-altering capability. Both the cyclorotors and wing arrangements are admitting a safe and efficient functional status of the proposed prolusion system, bringing increased efficiency to the downwash airflow of the cyclorotors and process the airstream in order to design an effectively enhanced propulsion system, providing vertical take-off and landing phases for aircraft in various scales.

With the proposed invention, the aircraft can take-off and land from/on both marine and ground surfaces in all conditions, and on emergency conditions where an internal failure or malfunction occurs, allows the aircraft to glide to an even land with any possible surface characteristics, and thus, the safety factor is also noticeably enhanced.

Another important feature of this invention is the use of DBD plasma actuators on the bottom wing. Employing DBD plasma actuators can efficiently improve the overall functionality of this flight propulsion system in several operating aspects. Plasma actuators are electronic devices with proven ability for active flow control. These devices, when operated, produce a body force which pulls the adjacent air toward the surface, in which they are applied, and accelerates it downstream, in a tangential direction to the surface. Due to this phenomenon, these devices are effective for many applications within the active flow control field, such as separation control, wake control, aircraft noise reduction, modification of velocity fluctuations or boundary layer control. These devices are very attractive because they present very low mass and are fully electronic. Therefore, they allow to manipulate the flow field by electronic means, reducing the need of mechanical components which would increase the weight of the aircraft. Moreover, they present fast response time, meaning that, accordingly with the flight conditions, they may be instantaneously enabled or disabled. In addition, although they require a high voltage signal to operate, the current is very small, in the order of milliamps. Therefore, these devices present low power consumption. Therefore, in the present invention, plasma actuators are applied on the top surface of the bottom wing in order to attach the flow to surface and delay its separation. By this, the losses are reduced, and the efficiency of the propulsion system is increased.

Yet in another proposed embodiment, plasma actuators may be also applied in the cycloidal rotor blades in order to enhance the lift and thus increase the efficiency of the flight propulsion system. Since plasma actuators present proven ability for de-icing and ice prevention, they may also be used to prevent the accumulation of ice in the components of the flight propulsion system. According with this, the plasma actuators may operate as flow control and anti-icing devices, which turns the proposed propulsion system suitable for aircraft intend to fly under ice formation conditions.

Considering the above, the developed system herein disclosed can be applied as a potential flight propulsion system for different scales of aircraft. Said system provides vertical take-off and landing (VTOL) or even short take-off and landing (STOL) flights for aircraft operating in variety of missions such as UAVs, MAVs, rescue aircraft, payload carriage crafts, commercial aircraft and etc. Considering the significant features that this flight propulsion system proposes, it can be an efficient substitution for the others in aircraft which might handle critical missions where they definitely face VTOL states and even take-off and landing circumstances on marine and sea surfaces.

BRIEF DESCRIPTION OF THE DRAWINGS

For better understanding of the present application, figures representing preferred embodiments are herein attached which, however, are not intended to limit the technique disclosed herein.

FIG. 5 represents a lateral view the yawing rotation of the rear cyclorotors on each side of the aircraft and the resulting downwash inclination where:
32—yaw angle of the left-side rear cyclorotor,
33—yaw angle of the right-side rear cyclorotor,
34—inclined angle of the downwash flow from left-side rear cyclorotor,
35—inclined angle of the downwash flow from right-side rear cyclorotor.

DESCRIPTION OF EMBODIMENTS

Figure 1:
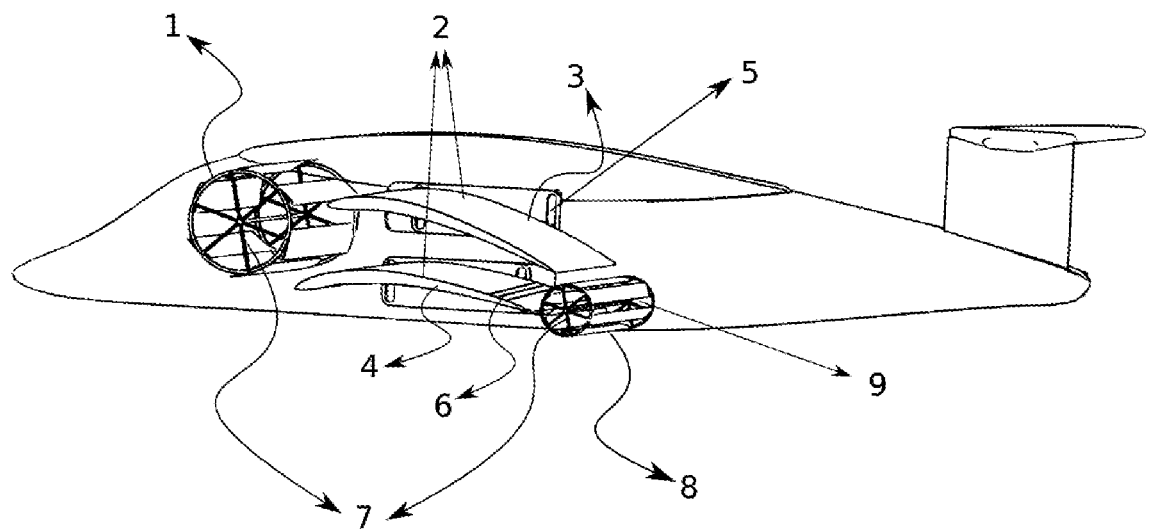
FIG. 1: represents a schematic of the flight propulsion system, applied to an aircraft, with a combination of cycloidal rotors, lateral wings and DBD plasma actuators on the wing surface, where:
    1—front cyclorotor,
    2—pair-wings,
    3—top wing,
    4—bottom wing,
    5—three degree of freedom (3-DOF) control mechanism from the pair-wings,
    6—dielectric barrier discharge (DBD) plasma actuator strip tapes,
    7—bar-mechanism for pitching oscillation controls of the cyclorotors,
    8—rear cyclorotor,
    9—yawing control mechanism of the rear cyclorotors.

With reference to the figures, some embodiments are now described in more detail, which are however not intended to limit the scope of the present application.

The invention herein described is related to a flight propulsion system for Vertical Take-Off and Landing (VTOL) and Short Take-Off and Landing (STOL) aircraft which comprises pair-wings (2) and two cyclorotors (1, 9) for each side of the aircraft. The illustration given herein reveals a declaration of this flight propulsion system which is considered for one side of the vehicle. Thus, it can be then configured for both sides for real aircraft applications.

The proposed cyclorotors (1, 8) are mainly constituted by a plurality of blades (10), at least four blades on each cyclorotor (1, 8), that rotate together around the center axis (16) of said cyclorotor (1, 8), and are angle adjusted around their own axis (14), changing the pitching angle (11). The only difference between the front and rear cyclorotors (1, 8) resides in the fact that the front cyclorotor (1) presents a bigger radius (15) than the rear cyclorotor (8). The cyclorotor (1), given its characteristics, works as main airflow thruster of the aircraft.

FIG. 1 shows a schematic of this flight propulsion system, applied to the left side of an aircraft, and the settlement of the components where the front cyclorotor (1) operates as the main component to inhale airflow (26) for this flight propulsion system. This cyclorotor is positioned about in the mid vertical location of the top horizontal wing (3) and bottom horizontal wing (4). The relative positioning of both wings (2), namely, top wing (3) and bottom wing (4), is adjustable according to the 3-DOF control mechanism (5) for pair-wings.

The 3 DOF system provides three degrees of freedom to each wing (3, 4). Each wing top wing (3) or bottom wing (4) can move in a vertical displacement, horizontal displacement and rotation with regard to his center (21, 24). By this, it is possible to change the horizontal position of each wing leading edge in relation to the front cyclorotor (1), allowing it to control the inlet (17) and outlet (18) patch heights and the angle of attack (20, 23) of the wings (3, 4). These parameters should be changed for different flight modes in order to improve the system efficiency.

The two wings (3, 4) are, at the same time, playing the role of cascade with nozzle-shape channel that, with the assistance of the dielectric barrier discharge DBD plasma actuators (6), directs the airstream toward the rear cyclorotor (8).

Both cyclorotors are equipped with bar-mechanisms for pitching oscillation control (7). These mechanisms allow to stablish the desired rotational speed (13) and pitching oscillations for each cyclorotor (7) and pitching oscillations for each single blade (11), respectively. In spite of the pitching oscillation variations in both cyclorotors (1, 8) that gives a reasonable control and manoeuvrability, a yawing control mechanism of the rear cyclorotor (9) is also considered which results in instant shift to flight direction.

In a proposed embodiment, the bottom wing (4) front edge is positioned below the front cyclorotor (1) in a horizontal displacement covering between 0.5R to 1R, where R represents the radius (15) of the front cyclorotor (1) from the center (16). The dielectric barrier (6) discharge plasma actuator installed on the wings is constituted by two electrodes asymmetrically mounted on each side of a dielectric layer material which electrically insulates one electrode from the other. One of the electrodes is exposed to the air and power supplied by an AC voltage signal with voltage amplitudes between 5 and 80 kVpp and frequencies between 1 and 60 kHz. The second electrode is grounded and completely covered by the dielectric material. The bar-mechanism (7) for pitching oscillation controls of the blades (10) is constituted by the center axis of the blade (14) connected to a servo engine which rotates said axis for the desired pitching angles (11). The rear cyclorotor (8) comprises a yawing control mechanism (9) that allows to achieve instant shifting of the aircraft flight direction by means of a gear mechanism set.

Figure 2:
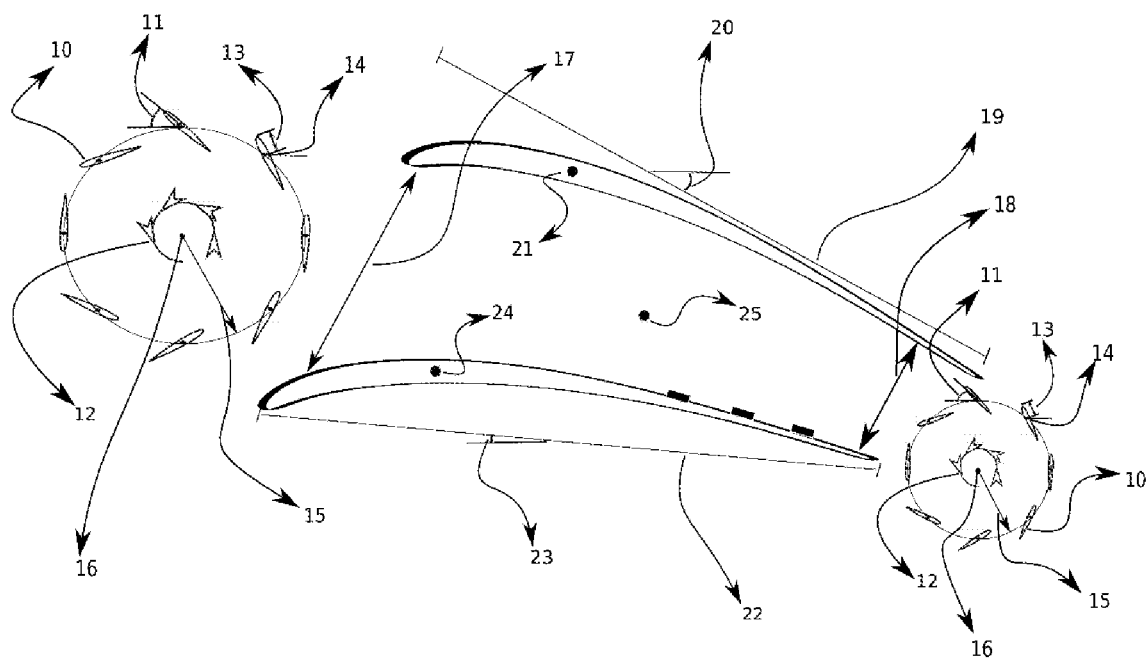
FIG. 2: represents the flight propulsion system with the details of operation, where:
    10—blade profile of the cyclorotor, 11—maximum pitching oscillation angle of the cyclorotor blade,
12—rotation speed of cyclorotor,
13—distance between pivot point and leading edge of the blade in cyclorotor,
14—pivot point of the blade in cyclorotor,
15—radius of the cyclorotor,
16—center location of cyclorotor/center axis,
17—inlet patch of the pair-wings cascade,
18—outlet patch of the pair-wings cascade,
19—chord length of the top wing,
20—angle of the top wing,
21—aerodynamic control center of the top wing,
22—chord length of the bottom wing,
23—angle of the bottom wing,
24—aerodynamic control center of the bottom wing,
25—reference center point.

FIG. 2 illustrates the functional dynamic specifications of this flight propulsion system. Four principal center locations are defined. The center location (16) of cyclorotors (1, 8), the aerodynamic control center of top wing (21), aerodynamic control center of bottom wing (24) and the reference center point (25) to compute the coordinates of each of these mentioned components in accordance with that to ensure the relative horizontal and vertical distances. Like the profile and type of the wings (3, 4), the chord length of the top wing (19) and the chord length of the bottom wing (22), as well as the angle of the top wing (20) and the angle of the bottom wing (23), are going to be chosen individually according to the desired outcome. The type of the blade profile of the cyclorotor (10), maximum pitching oscillation angle of the cyclorotor blade (11), rotation speed of cyclorotor (12), distance between pivot point and leading edge of the blade in cyclorotor (13), pivot point of the blade in cyclorotor (14) and radius (15) of the cyclorotor are technically considered and analysed for each of the front and rear cyclorotors, uniquely. Using the 3-DOF control mechanism for pair-wings (5), the inlet patch of the pair-wings cascade (17) and outlet patch of the pair-wings cascade (18) can be actively changed to control the passing flow portion, and the velocities at the entrance and the exit sections of the cascade.

The height of the inlet patch (17) can be set within a value range of R to 3R, wherein the R is related to the radius (15) of the front cyclorotor (1). The outlet patch (18) height, in a proposed embodiment, comprises a range of values set within a range of 20% to 80% of the height of the inlet patch (17).

In a proposed embodiment, the pitching oscillation angle (11) of the cyclorotor blade (10) comprises a range set between 15° and 45°. The chord length of the top wing (19) defines the system geometrically, varying in length between 2R and 4R, where R represents the front cyclorotor (1) radius (15). The aerodynamic control center (21) of the top wing (3) can vary in distance between 0.25C to 0.5C from the leading front edge of said top wings, where C represents the chord length (19) of the said wing (3). In a similar way, the chord length (22) of the bottom wing (4) defines the system geometrically, varying in length between 2R and 4R, where R represents the front cyclorotor (1) radius (15). Again, the aerodynamic control center (24) of the bottom wing (4) can vary in distance between 0.25C to 0.5C from the leading front edge of said bottom wing, where C represents the chord length (22) of the said wing (4).

In a proposed embodiment, the radius (15) of the rear cyclorotor (8) is within a value range set between 20% and 80% of the radius (15) of the front rotor (1).

Figure 3:
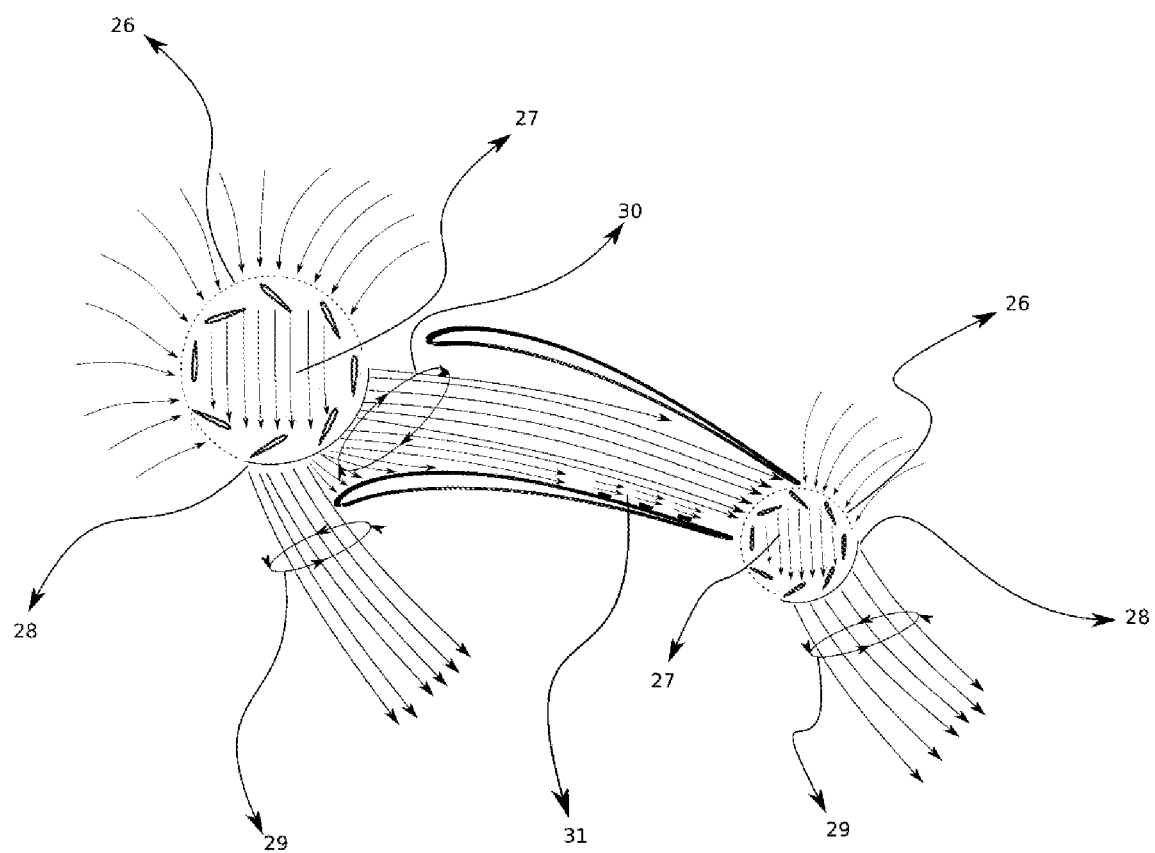
FIG. 3: represents the airflow sections functioning in the flight propulsion system, where:
26—airflow inhale region of the cyclorotor,
27—in-cage flow,
28—downwash region of cyclorotor,
29—free-downwash flow of the cyclorotor,
30—flow portion entering the pair-wing cascade,
31—induced flow from DBD plasma actuators.

FIG. 3 reveals the working principles of the fluid air flow passing through this flight propulsion system where the initial airstream enters the front cyclorotor (1), from the airflow inhale region of the cyclorotor (26), and exits from the downwash region of cyclorotor (28). As is defined in this figure, and from what the fundamentals of cyclorotors declare, in a counter clock-wise rotating cyclorotor, the flow enters from the airflow inhale region of the cyclorotor (26). Then, exits from the downwash region of cyclorotor (28) in rightward inclined flow stream. The purpose of the larger distance of the top wing (3) from the front cyclorotor (1) is to let the airstream enter the cyclorotor in its ultimate flow rate and to avoid limitations in this regard. The nature of the flow inside the cyclorotor is vertically downward direction, as is shown with in-cage flow (27). The bottom wing (4) is thus located in the mid-way to the flow, downwash region of front cyclorotor (1), splitting the flow into two separate portions. One portion convects inside the pair-wings nozzle-shape cascade, as flow portion entering the pair-wing cascade (30), and the other portion sheds as free-downwash flow of the cyclorotor (29). This downwash portion contributes as the front lift force production of this flight propulsion system. By adjusting the inlet patch of the pair-wings cascade (17), and also the outlet patch of the pair-wings cascade (18), the free-downwash flow of the cyclorotor (29) from the front rotor and the shedding flow toward the rear cyclorotor (8) can be controlled. In addition, the flow portion entering the pair-wing cascade (30) can be subjected to different angles and speeds by the different arrangements of the top wing (3) and bottom wing (4).

Two lateral movements and a rotation motion can be assigned to the aerodynamic control center (21) of the top wing (3) and aerodynamic control center (24) of the bottom wing (4) using the 3-DOF control mechanism for pair-wings (5). These adjustments can play significant roles in controlling aircraft lift and thrust forces in different flight phases like forward cruise flight, take-off, landing and hover states.

The inducement of higher speed airstream (31) and pressure difference toward rear cyclorotor is the key mission of the pair-wings nozzle-shape cascade (2) with DBD plasma actuators (6). The other major task of DBD plasma actuators is to minimize the flow perturbations and re-laminarization of the airstream while convecting toward rear cyclorotor (8). This fact results in a considerably more stable operation, less fatigue and more efficient functional status for the rear cyclorotor (8). DBD Plasma actuators (6) used in one proposed embodiment of present invention are composed by at least two electrodes and one dielectric layer, which electrically insulates the covered electrode. The electrodes can be made of copper or aluminium foil. For the dielectric layer it is possible to use Kapton, Teflon, Macor ceramic, silicon or rubber. The Plasma actuators (6) operate in such a way that the flow over the bottom wing (4) is attached to the surface and its separation point is delayed. In one embodiment, plasma actuators (6) are power supplied by an AC high voltage and high frequency signal generator circuit able to produce voltages in a range of 5-80 kVpp and frequencies in a range 1-80 kHz. Yet in other embodiment, the plasma actuators (6) are supplied by a nanosecond pulse generator circuit which produces a signal with pulses width in the range of 10-100 ns. Yet in another embodiment, the plasma actuators (6) may comprise a third electrode which operates as a sliding discharge electrode and it is supplied by a DC power source. In any of the referred embodiments the plasma actuators (6) may present either a dielectric layer with constant thickness or a dielectric layer mounted in a stair shaped configuration. During the plasma discharge, the surface temperature may achieve temperatures higher than 100° C., therefore, if necessary, plasma actuators (6) are also used to perform de-icing and/or ice formation prevention.

The outlet patch of the pair-wings cascade (18) is configured in such a way that exerts flow induction in the airflow inhale region of the cyclorotor (26). The taken strategy leads to efficiency enhancement in the rear cyclorotor (8) where the rotation speed of cyclorotor (12) is considerably higher in rear cyclorotor than the one in the front cyclorotor (1). The outlet patch of the pair-wings cascade (18) is covering a significant portion of the airflow inhale region of the cyclorotor (26) at rear side. This fact technically changes the functional state of the cyclorotor since it is not working in null-velocity anymore. The flow volume rate entering and leaving the rear cyclorotor (8) then needs to be analysed in order to sustain the controllability of the whole propulsion mechanism. The nature of the flow exiting the pair-wings cascade (2) can highly affect the in-cage flow (27) in rear cyclorotor with both direction and velocity. The in-cage flow (27) direction is basically vertical downward but, in the case of rear cyclorotor (8), since there is an adjacent flow entrance from the subsequent settled passage, the in-cage flow direction (27) might alter significantly. This fact can be positively attributed to a better thrust production procedure. Considering the above-mentioned, the result of this configuration results in a airflow velocity at the outlet patch (18) higher than the airspeed at the inlet patch (17).

Figure 4:
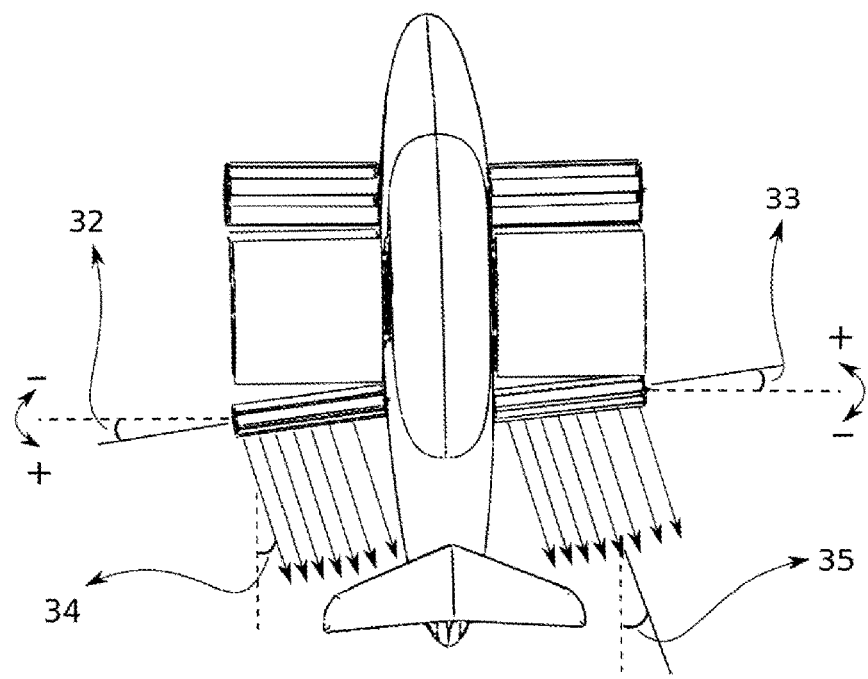
FIG. 4: represents a top view of the yawing rotation of the rear cyclorotors on each side of the aircraft and the resulting downwash inclination where:
32—yaw angle of the left-side rear cyclorotor,
33—yaw angle of the right-side rear cyclorotor,
34—inclined angle of the downwash flow from left-side rear cyclorotor,
35—inclined angle of the downwash flow from right-side rear cyclorotor.
Figure 5:
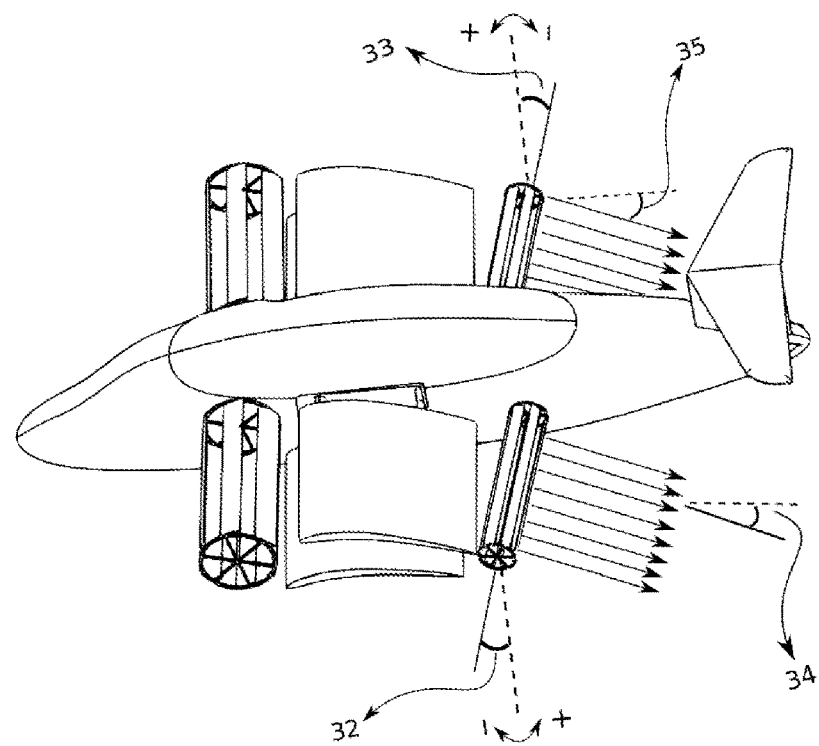
FIG. 5: similarly, to FIG. 4.

FIG. 4 and FIG. 5 represents an aircraft equipped with the proposed flight propulsion system on both sides. The main concern in these figures is the effect of yawing control mechanism of the rear cyclorotor (9) on the free-downwash flow of the cyclorotor (29) of rear side. While considering the aircraft from the top view, as in FIG. 4, for the downwash flow from the rear cyclorotor, positive yaw is attributed to the right inclined and the negative is regarded for when the downwash flow is inclined leftward. These positive and negative signs have arbitrarily been assigned for further clarifications and discussions. So, as is demonstrated in bot FIGS. 4 and 5, when the yaw angle of the left side rear cyclorotor (32) goes positive, a reverse format occurs for the yaw angle of the right side rear cyclorotor (33). Any assigned yaw angle has an impact on the inclined angle of the downwash flow from left-side rear cyclorotor (34) and inclined angle of the downwash flow from right-side rear cyclorotor (35). The main reason to employ the yawing control mechanism of the rear cyclorotors (9) is to attain a considerably higher control for the last flow exiting the flight propulsion system. By the use of the yawing control mechanism of the rear cyclorotors (9), we can achieve instant shifting of the aircraft flight direction. This characteristic is considered a lack of control efficiency in most of the aircraft to respond to instant altering the flight direction.

In a proposed embodiment, the yaw angle of the rear cyclorotors, namely, the yaw angle of the left-side rear cyclorotor (32) and the yaw angle of the right-side rear cyclorotor (33), may vary between +35° degrees and −35° degrees with regard to the perpendicular trajectory of the plane. When the yaw angle of the left-side rear cyclorotor (32) is positive, the yaw angle of the right-side rear cyclorotor (33) should be negative, and vice-versa, in order to allow the plain to perform the changing in the direction. However, in order to promote the movement of the plane, both yaw angles (32, 33) do not need to be necessary opposite in terms of angle definition.

The invention claimed is:

1. A flight propulsion system applied to an aircraft, each side of the aircraft comprising
 a set of
  a top wing;
  a bottom wing, placed below the top wing within a range of an inlet patch and a range of an outlet patch;
  a front cyclorotor, with a predetermined radius, placed in front of both the top wing and the bottom wing, aligned with the inlet patch;
  a rear cyclorotor, with a predetermined radius, placed in front of the top wing and the bottom wing, aligned with the outlet patch;
  a yawing control mechanism applied on the rear cyclorotor;
 wherein
  the top wing is arranged horizontally within a first angle and the bottom wing is arranged horizontally within a second angle,
  the bottom wing is placed in an advanced horizontal position with regard to the top wing lying partially bellow the front cyclorotor,
  the top wing is placed in a retracted horizontal position with regard to the bottom wing lying partially over the rear cyclorotor, and
  the yawing control mechanism of the rear cyclorotors promotes the creation of a yaw angle on the left-side and a yaw angle of the right-side with regard to the perpendicular trajectory of the aircraft.

2. The system according to claim 1, wherein the radius of the rear cyclorotor comprises a range of values between 20% to 80% of the radius of the front cyclorotor.

3. The system according to claim 1, further at least one dielectric barrier discharge plasma actuator installed over the rear edge of the bottom wing.

4. The system according to claim 1, further comprising a three degree of freedom control mechanism operating independently both top wing and bottom wing.

5. The system according to claim 1, wherein the front cyclorotor and the rear cyclorotor further comprise a set of at least four blades.

6. The system according to claim 5, wherein the set of at least four blades further comprises dielectric barrier discharge plasma actuators.

7. The system according to claim 6, wherein the set of at least four blades is adjusted in a pitching oscillation angle.

8. The system according to claim 3, characterized in that wherein the dielectric barrier discharge plasma actuator comprises two electrodes asymmetrically mounted on each side of a dielectric layer material which provides electrical insulation between both electrodes.

9. The system according to claim 8, wherein one of the electrodes is power supplied by an AC voltage signal with voltage amplitudes between 5 and 80 kVpp and frequencies between 1 and 60 kHz.

10. The system according to claim 4, wherein the three degree of freedom control mechanism controls independently vertical displacement, horizontal displacement the first angle and the second angle of both the top wing and the bottom wing with regard to front cyclorotor and rear cyclorotor.

11. The system according to claim 1, wherein the yaw angle of the left-side rear cyclorotor and the yaw angle of the right-side rear cyclorotor comprise values set between +35° degrees and −35° degrees with regard to the perpendicular trajectory of the plane.

* * * * *